United States Patent
Glass et al.

[11] Patent Number: 5,812,711
[45] Date of Patent: Sep. 22, 1998

[54] MAGNETOSTRICTIVELY TUNABLE OPTICAL FIBER GRATINGS

[75] Inventors: Alastair Malcolm Glass, Rumson; Sungho Jin, Millington; Paul Joseph Lemaire, Madison; Thomas A. Strasser, Chatham, all of N.J.

[73] Assignee: Lucent Technologies Inc., Murray Hill, N.J.

[21] Appl. No.: 791,083

[22] Filed: Jan. 29, 1997

[51] Int. Cl.⁶ .................. G02B 6/34; H04J 14/00
[52] U.S. Cl. .................. 385/37; 385/6; 385/12; 385/8; 385/15; 385/16; 385/24; 359/115; 359/127; 359/130
[58] Field of Search .................. 385/12, 15, 37, 385/24, 16, 17, 6, 8, 131; 359/115, 116, 127, 130, 124

[56] References Cited

U.S. PATENT DOCUMENTS

| | | | |
|---|---|---|---|
| 5,394,488 | 2/1995 | Fernald et al. | 385/13 |
| 5,600,473 | 2/1997 | Huber | 385/10 X |
| 5,608,825 | 3/1997 | Ip | 385/24 |
| 5,680,489 | 10/1997 | Kersey | 385/12 |

*Primary Examiner*—Brian Healy

[57] ABSTRACT

In accordance with the invention, a tunable fiber grating comprises a fiber grating secured to a magnetostrictive body so that magnetostrictive strain will be transmitted to the grating. An electromagnet is disposed adjacent the magnetostrictive body for applying a magnetic field along the body. Control of the current applied to the electromagnet permits control of the strain transmitted to the fiber grating, and thus control of the grating spacing and reflection frequency. In a preferred embodiment the magnetostrictive body is cylinder bonded along the grating. In alternative arrangements, the magnetostrictive effect can be mechanically amplified. An add/drop multiplexer employing the tunable gratings is described.

16 Claims, 4 Drawing Sheets

MAGNETOSTRICTIVELY TUNABLE OPTICAL FIBER GRATINGS

FIELD OF THE INVENTION

This invention relates to optical fiber gratings and, in particular, to fiber gratings tunable by magnetostrictive strain.

BACKGROUND OF THE INVENTION

Optical fibers are key components in modern telecommunications systems. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high purity silica with minor concentrations of dopants to control the index of refraction.

Optical fiber Bragg gratings are important elements for selectively controlling specific wavelengths of light within an optical fiber. A typical Bragg grating comprises a length of optical fiber including a plurality of perturbations in the index of refraction substantially equally spaced along the fiber length. These perturbations selectively reflect light of wavelength $\lambda$ equal to twice the spacing $\Lambda$ between successive perturbations, i.e. $\lambda = 2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, stabilization of semiconductor lasers, reflection of fiber amplifier pump energy, and compensation for fiber dispersion.

Conventional fiber Bragg gratings are conveniently fabricated by providing fiber with one or more dopants sensitive to ultraviolet light, such as fibers having cores doped with germanium oxide, and exposing the fiber at periodic intervals to high intensity ultraviolet light from an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

A difficulty with conventional fiber Bragg gratings is that they filter only a fixed wavelength. Each grating selectively reflects only light in a narrow bandwidth centered around $\lambda = 2n_{eff}\Lambda$. However in many applications, such as multiplexing, it is desirable to have a tunable grating whose wavelength response can be controllably altered.

One attempt to make a tunable fiber grating uses a piezoelectric element to strain the grating. See Quetel et al., 1996 Technical Digest Series, Conf. on Optical Fiber Communication, San Jose, Calif., Feb. 25–Mar. 1, 1996, Vol. 2, p. 120, paper No. WF6. The difficulty with this approach is that the strain produced by piezoelectric actuation is relatively small, limiting the tuning range of the device. Moreover, it requires a continuous application of relatively high voltage, e.g., approximately 100 volts for 1 nm strain. Accordingly, there is a need for a tunable fiber grating having an enhanced tuning range and no requirement for continuous power.

SUMMARY OF THE INVENTION

In accordance with the invention, a tunable fiber grating comprises a fiber grating secured to a magnetostrictive body so that magnetostrictive strain will be transmitted to the grating. An electromagnet is disposed adjacent the magnetostrictive body for applying a magnetic field along the body. Control of the current applied to the electromagnet permits control of the strain transmitted to the fiber grating, and thus control of the grating spacing and reflection frequency. In a preferred embodiment the magnetostrictive body is a cylinder bonded along the grating. In alternative arrangements, the magnetostrictive effect can be mechanically amplified. An add/drop multiplexer employing the tunable gratings is described.

BRIEF DESCRIPTION OF THE DRAWINGS

The advantages, nature and additional features of the invention will appear more fully upon consideration of the illustrative embodiments described in the accompanying drawings. In the drawings.

It is to be understood that these drawings are for purposes of illustrating the concepts of the invention and are not to scale.

DETAILED DESCRIPTION

Figure 1:
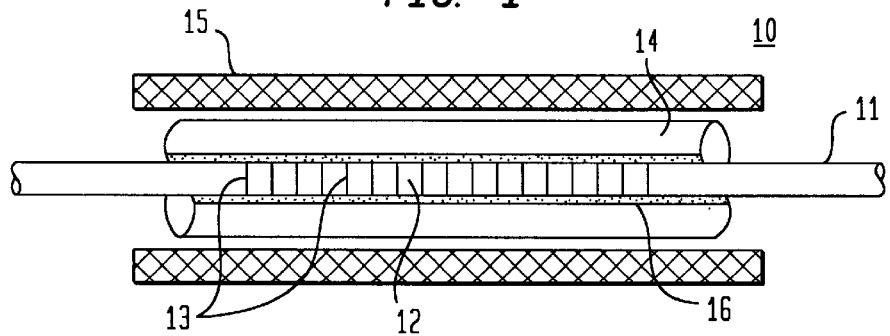
FIG. 1 schematically illustrates a first embodiment of a tunable fiber grating.

Referring to the drawings, FIG. 1 schematically illustrates a tunable fiber grating 10 comprising a length of optical fiber 11 including a grating 12 of index perturbations 13. The fiber in the region of the grating is secured, as by bonding or mechanical attachment, to the body 14 of magnetostrictive material for transmitting strain from the body 14 to the grating 12. The body 14 can conveniently be a cylinder of magnetostrictive material concentrically surrounding the fiber grating region. An electromagnet (solenoid) 15 is disposed adjacent the body 14 for providing a controllable magnetic field along the body 14. The field strains the body along the direction of the fiber grating.

The fiber grating is firmly attached, either by mechanical clamping or by bonding, as with epoxy or solder, to an inside hole of the magnetostrictive cylinder. In the use of solder, the fiber surface is desirably coated with a metal layer to improve solder bond strength. Here the adhesive is shown as bonding layer 16.

The magnetostrictive material of body 14 is a material, such as a ferromagnetic or ferri-magnetic material, which expands or contracts in length when an externally applied magnetic field magnetizes the material and aligns internal magnetic domains. Application of short duration magnetic pulses can be used to alter the length of the body 14 and hence the length (and spacing) of the attached fiber grating by a predetermined amount. The magnetic pulses can be produced by the application to the electromagnet of current pulses from a source of pulsed current (not shown).

The magnetostriction can be either positive (an increase in length) or negative (a decrease in length) depending on the type of magnetic material used. Some exemplary materials for negative magnetostriction along with their saturation strain ($\epsilon_s$) are $\epsilon_s \sim -38 \times 10^{-6}$ for nickel, $-50 \times 10^{-6}$ for cobalt, $-2340 \times 10^{-6}$ for $SmFe_2$. Examples of materials for positive magnetostriction are $\epsilon_s \neq +33 \times 10^{-6}$ for an Fe-20 weight % Ni alloy, $+130 \times 10^{-6}$ for a 70%Co-30%Fe alloy, $+61 \times 10^{-6}$ for an Fe-30%Cr-15%Co alloy, $+36 \times 10^{-6}$ for Alnico 5 alloy, $+32 \times 10^{-6}$ for $Fe_3O_4$ ferrite, $+2600 \times 10^{-6}$ for $TbFe_2$, and $+1100 \times 10^{-6}$ for $Tb_{0.28}Dy_{0.72}Fe_2$ alloy. The magnitude of the magnetostriction, as well as its field-dependent behavior, varies somewhat with the material composition and processing. Optimization of these parameters is desirable to maximize the strain. For further details concerning magnetostrictive materials, see R. M. Bozorth, *Ferromagnetism*, Chapter 13, p. 647–649 and p. 663–669 (Van Nostrand, N.Y., 1951); A. E. Clark, *AIP Conference Proc. No.* 18 American Institute of Physics, N.Y., 1974, p. 1015, W. R. Jones, *IEEE Trans. Magn.* Vol. MAG17, p. 1459, 1981, all of which are incorporated herein by reference.

For a nominal (median) beam wavelength for optical fiber communication of $\lambda \sim 1550$ nm, he corresponding Bragg-reflecting fiber grating has a periodic spacing $\lambda$ of ~500 nm. The wavelength signals in modern optical fiber communications typically have the adjacent channels separated by about 0.8 nm. This inter-channel spacing difference corresponds to a strain $\Delta e = (\Delta\lambda/\lambda)/(1-P_c) = (0.8 \text{ nm}/1550 \text{ nm})/(1-0.22) = 6.6 \times 10^{-4}$. Such a strain is obtainable using, for example, $TbFe_2$ or $SmFe_2$.

Figure 2:
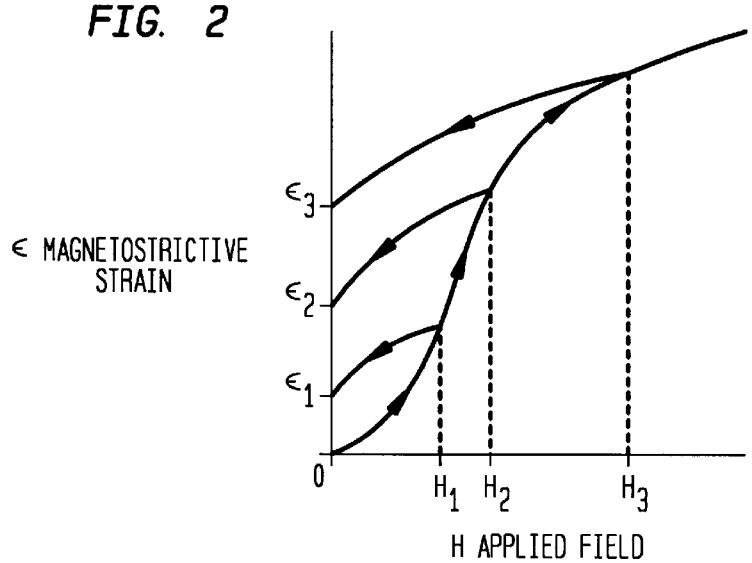
FIG. 2 is a schematic graphical illustration useful for describing the programmability of rema nent strain by adjusting the applied magnetic field.

FIG. 2 is a schematic plot of the magnetostrictive strain $\epsilon$ as a function of the applied magnetic field H. There is a left-over magnetostrictive strain after the field is removed. The remament strains for the field strengths $H_1$, $H_2$, and $H_3$ are $\epsilon_1$, $\epsilon_2$, and $\epsilon_3$, respectively. The magnitude of this remament strain depends on the magnitude of the applied field. It can be seen that the remament strain is programmable by selecting a proper field strength. For a magnetostrictive straining device with a latching capability, the magnetostrictive material advantageously has semi-hard or permanent magnet properties rather than soft magnetic properties. The desired coercivity ($H_c$) of the magnetostrictive material is at least 20 Oe, preferably at least 100 Oe.

Figure 3:
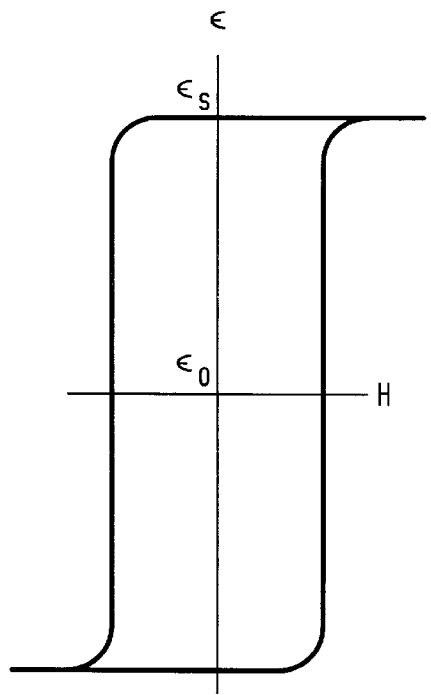
FIG. 3 is a schematic graphical illustration showing the bi-stable nature of the magnetostrictive strain.

FIG. 3 is a plot of the magnetostrictive strain $\epsilon$ vs applied field H for a cyclic variation showing a typical square hysteresis loop. Such a behavior is useful to produce a bistable device, where the strain switches between optical wavelengths, $\lambda_1$ and $\lambda_n$. Once the magnetizing field is removed, most of the saturation magnetization and saturation strain $\epsilon_s$ is retained, giving rise to a latchable strain. The magnetostrictive material can be brought back to the zero strain by demagnetizing with an AC field gradually diminishing in amplitude. Optionally, partial demagnetizing with an AC or a reverse DC field can be used to obtain any desired intermediate remament strain. The use of a pulse field is desirable to avoid the continuous use of electrical power. The speed of pulse magnetization can be typically in the range of $1-10^{-8}$ sec, and is preferably $10^{-2}-10^{-6}$ sec. The amplitude of the pulse magnetizing field is preferably in the range of 50–50,000 Oe, depending on the coercivity and the shape of the magnetization curve for the magnetostrictive material.

Figure 4:
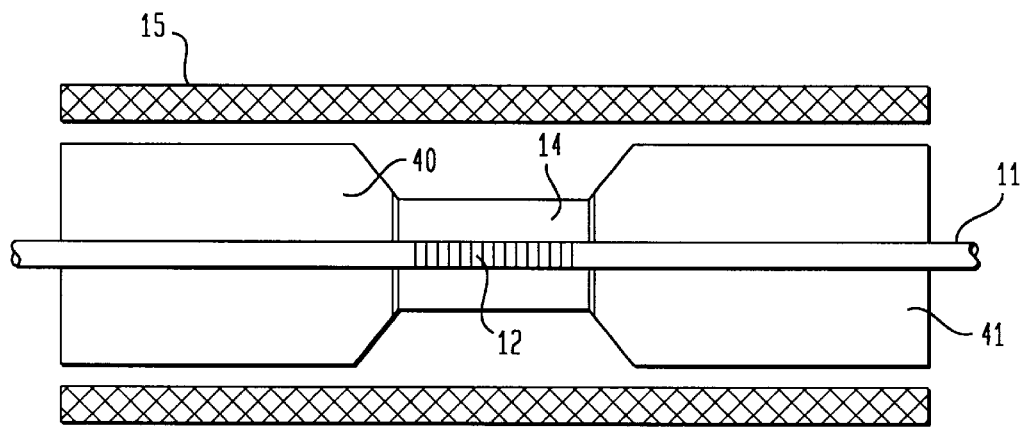
FIGS. 4 and 5 show modification of the FIG. 1 device.

FIG. 4 illustrates a modification of the FIG. 1 device wherein soft magnetic pole pieces 40, 41 are disposed at either end of the magnetostrictive body 14 to amplify the applied field. Pure iron poles under ideal geometry, for example, can achieve, at a field of less than 100 Oe, a saturation magnetization of 20,500 gauss, which is the upper limit of magnetic field obtainable from the pole surface.

Figure 5:
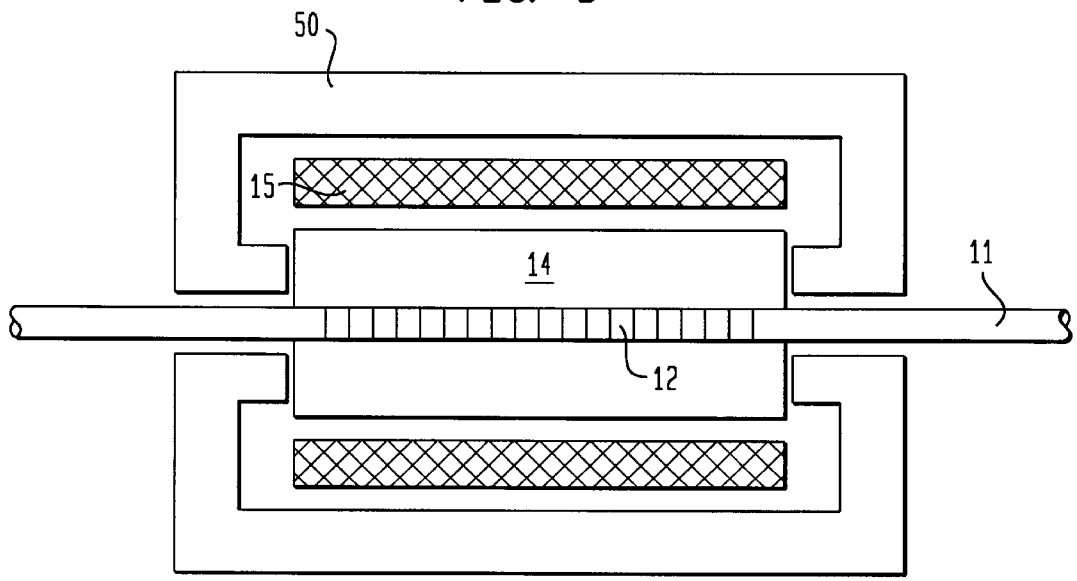

FIG. 5 illustrates a second modification of the FIG. I device wherein a magnetic flux return path 50 (preferably of iron) extends between opposing ends of the magnetostrictive body 14. The flux return path for the magnetostrictive component reduces the leakage flux and thus provides the maximum use of available magnetization.

Figure 6:
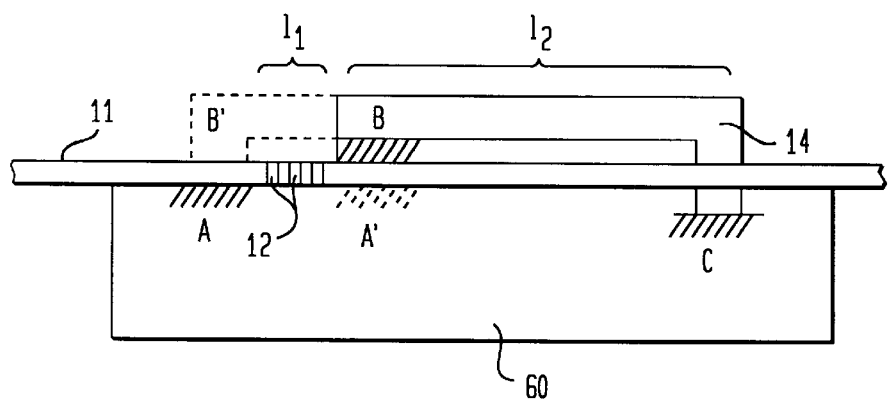
FIG. 6 illustrates an alternative embodiment of a tunable fiber grating.

For certain materials, the magnitude of magnetostriction may not be sufficient to induce enough dimensional changes in the fiber grating and cause the desired shift in wavelength channels. FIG. 6 illustrates an alternative embodiment of the invention wherein the length of the magnetostrictive body 14 applying strain is longer than the grating to which the strain is transmitted. As a result, the strain applied to the grating is mechanically amplified. In the figure, the fiber grating 12 has a length $l_1$ and the magnetostrictive body 14 has a length $l_2$. One end of the fiber grating is attached and fixed onto a rigid substrate 60 at Point A. The other end of the grating is attached to one end of the magnetostrictive body 14 at Point B. The magnetostrictive body is attached to the substrate at Point C. When the magnetostrictive strain is introduced as by pulse magnetization, the magnetostrictive strain on the fiber grating is amplified by the ratio of $l_2/l_1$. If the magnetostrictive component is 10 times longer than the fiber grating, the strain $\epsilon_s$ will be about 10 times larger than is attainable in a FIG. 1 configuration.

The substrate 60 can have either flat-surfaced block or cylinder configuration. The magnetostrictive body 14 can also have a blocky or cylindrical shape. For positive magnetostriction materials, the grating in FIG. 6 will contract, and for negative materials, the grating will elongate. The sign of induced strain can be reversed by a modification of the design in FIG. 6. For example, if the magnetostrictive body is attached onto the fiber grating at a Point B' instead of B and the other end of the grating to the substrate at A' instead of A, the grating will, for positive magnetostriction, be elongating instead of contracting. If a contracting strain on fiber grating is utilized, the grating should be confined in a tight-fitting, low-friction (optionally lubricated) capillary tube to minimize lateral deflection or local sticking of fiber and to maintain uniform applied stress on the fiber.

Figure 7:
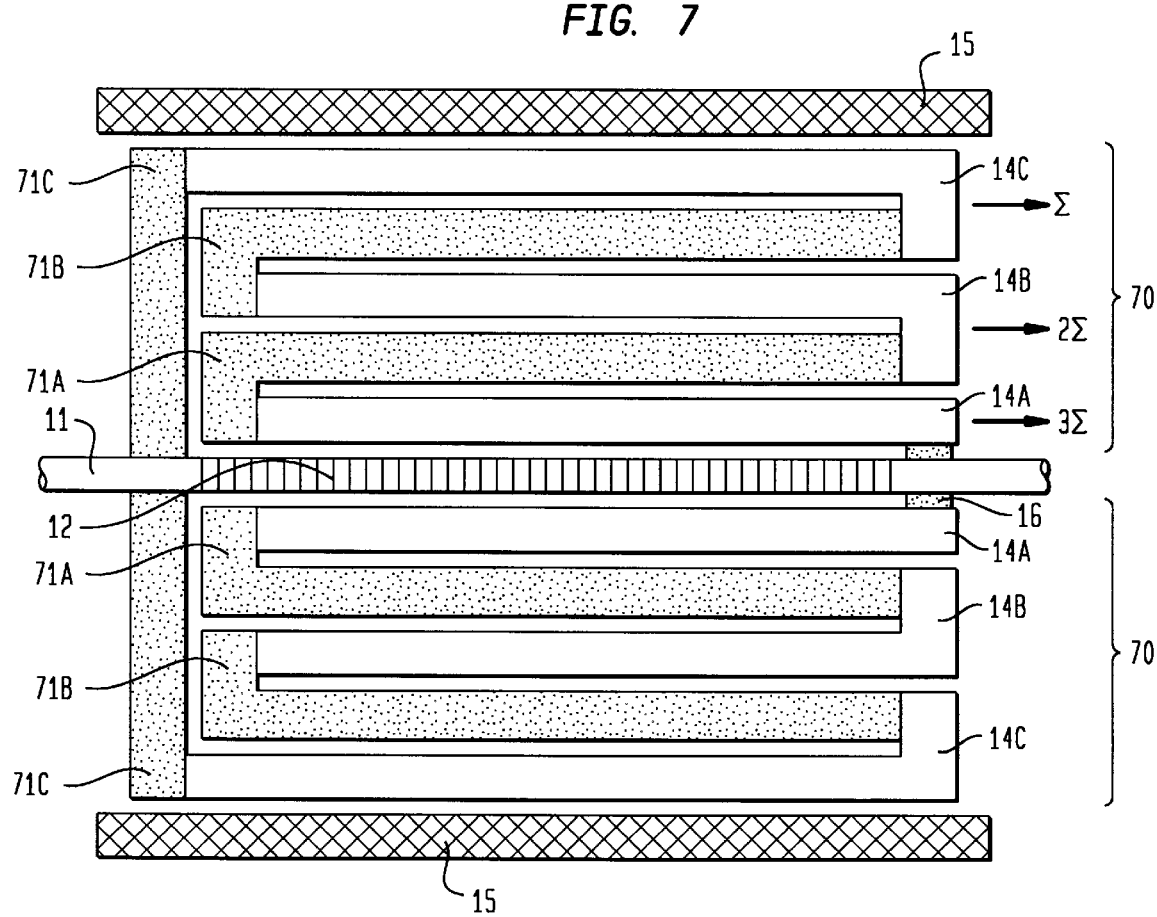
FIG. 7 is a modification of the FIG. 6 device.

FIG. 7 shows another embodiment for mechanically amplifying the magnetostrictive strain using a stack 70 of magnetostrictive layers 71A, 71B, 71C interconnected to effectively increase their length. This configuration is convenient in that the length of the device does not have to be increased. Here, alternating magnetostrictive layers 14A, 14B, 14C and non-magnetic support layers 71A, 71B and 71C are interconnected so that opposite ends of the magnetostrictive layers are connected. The magnetostrictive strain from the layers 14A, 14B, 14C are accumulated to yield amplified strain on the attached fiber grating 12. For example, an assembly consisting of 10 magnetostrictive layers of 70% Co-30% Fe alloy ($\epsilon_3 \sim 130 \times 10^{-6}$) will give a total strain of about $1300 \times 10^{-6}$ or 0.13% change in fiber grating dimension. For a grating with a corresponding Bragg reflection wavelength of $\lambda \sim 1550$ nm, this dimensional change can lead to a shift in wavelength by ~2 nm. For a wavelength channel spacing of 0.8 nm, this range permits tunability over more than 2 channels.

Figure 8:
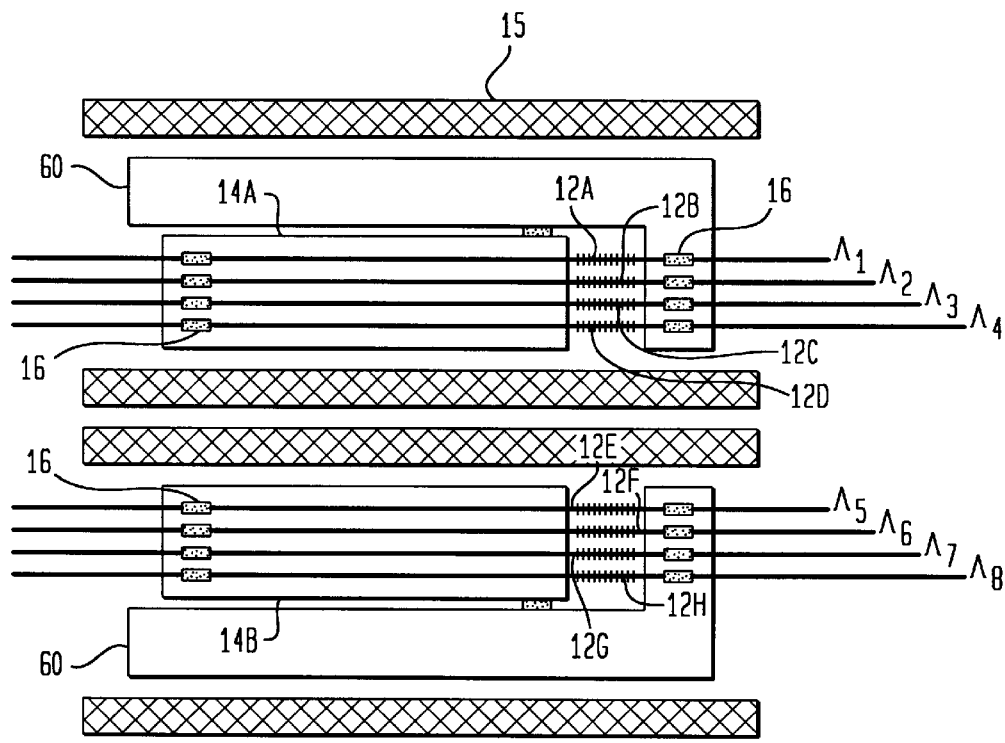
FIG. 8 illustrates a device for tuning plural fiber gratings.

Plural gratings can be secured to a single magnetostrictive body. FIG. 8 illustrates a device wherein a plurality of gratings 12A, 12B, 12C, . . . , 12H which can have different grating periods ($\Lambda_1$–$\Lambda_8$) are mounted on two different magnetostrictive blocks 14A, 14B. (Each block and its fibers are secured to respective common substrates 60.) If only the magnetostrictive block 14A is activated (magnetized) into the remament state, corresponding wavelengths $\lambda_1$–$\lambda_4$ in the attached fiber gratings will be Bragg reflected and filtered out. If the magnetostrictive block 14B is activated, $\lambda_5$–$\lambda_8$ will be filtered out. A similar configuration can also be used with a multitude of gratings with the same $\Lambda$ if many fiber communication routes are to be controlled simultaneously.

The gratings described herein are especially useful in wavelength division multiplexer/demultiplexer devices, including devices with ADD/DROP functionality. A wide variety of such devices can be made by interconnecting optical circulators and fiber gratings. In a DROP function device the grating is typically used to separate a single wavelength from a fiber that is carrying multiple wavelengths. The wavelength is typically diverted to another fiber. Gratings as described herein permit selection of which channel is dropped. In an ADD function device the grating is typically used to divert a wavelength channel from another fiber onto a trunk fiber. A tunable grating permits selection of which channel is added.

Figure 9:
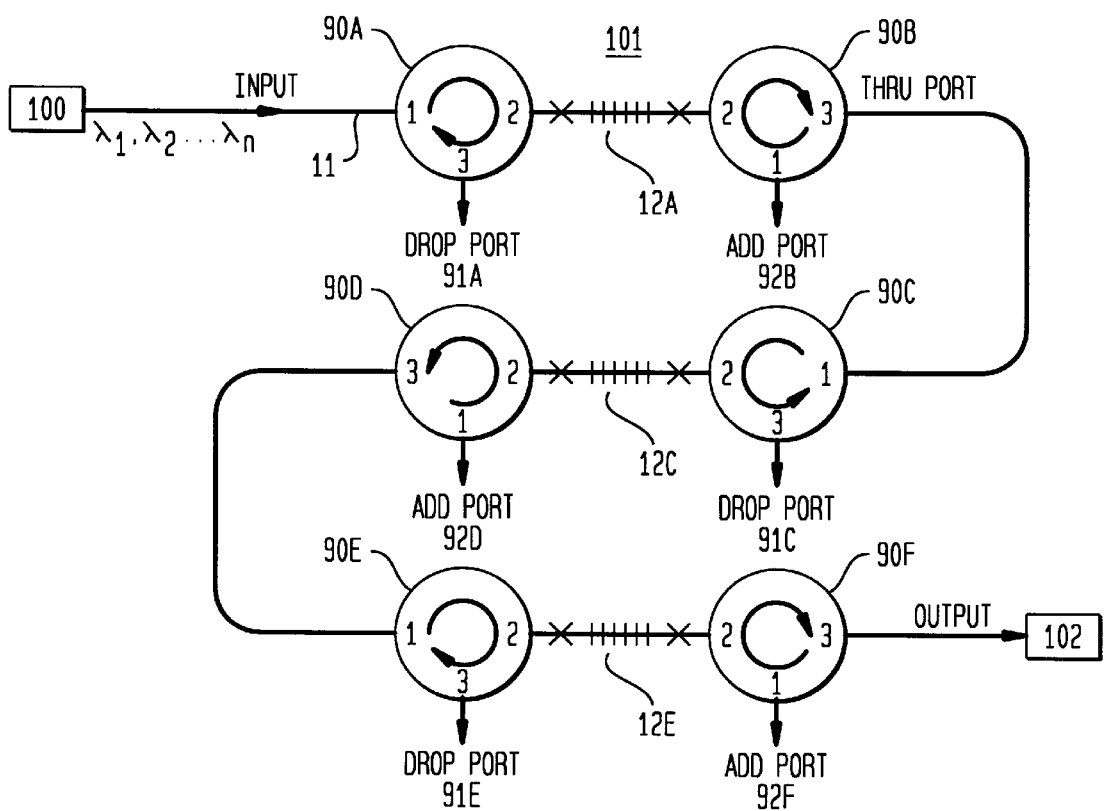
FIG. 9 illustrates an optical communications system employing an improved multiplexing/demultiplexing device using a tunable fiber grating.

FIG. 9 schematically illustrates a wavelength division multiplexed (WDM) communications system comprising a transmitter 100, an improved N-channel multiplexer/demultiplexer 101 and a receiver 102, all connected by trunk fiber 11. The input on fiber 11 consists of optical signals at several wavelengths, $\lambda_1$ to $\lambda_n$.

The improved multiplexer 101 comprises one or more pairs (here 3 pairs) of circulators. The circulators of each pair are separated by a grating. For example, the first pair of circulators comprises upstream circulator 90A and downstream circulator 90B separated by grating 12A. The second pair is 90C and 90D separated by grating 12C. In each pair, the upstream circulator (90A, 90C, 90E) serves to divert a forward propagating channel that matches the corresponding grating (12A, 12C, 12E) into a corresponding DROP port 91A, 91C, 91E. The downstream circulator (90B, 90D, 90F) similarly serves to insert into fiber 11 signals at ADD ports 92B, 92D, 92F, provided the wavelengths of the signals to be added correspond to the respective gratings 12A, 12C and 12E.

The device is improved by making any one of these gratings 12A, 12C, 12E tunable as set forth above, and preferably by making each tunable. If the grating is tuned so that it coincides with a different channel, then the different channel can be added or dropped. Moreover, a tunable grating can also perform a DISABLE function. If the grating is tuned between the channels, then the ADD/DROP function is temporarily disabled.

In alternative embodiments the improved multiplexer can comprise a single pair of circulators with a plurality of tunable gratings disposed between them for performing ADD, DROP or DISABLE functions.

EXAMPLE 1

A 16-channel, reconfigurable ADD/DROP system for wavelength division multiplexing is constructed using 16 magnetostrictively tunable fiber gratings connected in a series with associated circulators or directional couplers to serve as ADD or DROP ports as schematically illustrated in FIG. 9.

The nominal (mean) wavelength of the optical signal to be processed is 1550 nm, and the signal wavelength channels are separated from one another by a spacing of 0.8 nm, with a channel width of 0.3 nm. The refractive index periodicity ($\Lambda$) of each grating is made into a predetermined dimension so that all 16 gratings have their Bragg reflection wavelengths off by a half channel (placed at the between-channel positions), and hence with no tuning activated, all 16 wavelength signals pass through the ADD/DROP system without being filtered (dropped). If a certain selected group of channels (e.g., Channels #1, #3, and #11) need to be dropped, the magnetostrictive tuning devices for those gratings are activated by a magnetic pulse field so as to strain the fiber grating by ½ channel, e.g., $\Delta\lambda/\lambda$ of roughly 0.4 nm/1550 nm≈0.025%. The magnetostrictive material and the magnitude of the magnetic field applied is predetermined to produce and maintain this amount of remanent strain, and to make the channels #1, #3 and #11 Bragg reflected and filtered (dropped). To cancel the DROP operation a channel, of e.g. channel #3, a demagnetizing AC field with gradually decreasing amplitude (e.g. 60 Hz field applied for 2 seconds) is applied to the magnetstrictive element to remove the strain on the fiber grating. The ADD operation is performed in a similar manner (e.g. for channels #2, #9, #14 and #16) but with a backward transmission through a circulator and Bragg reflection in the forward direction.

It is to be understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. In a tunable optical fiber grating device comprising:
   a length of optical fiber including an optical grating along a portion of its length;
   a body of magnetostrictive material secured to said fiber for transmitting magnetostrictive strain from said body to said optical grating; and
   an electromagnet for applying a magnetic field to said body of magnetostrictive material, thereby straining said grating to alter its wavelength response;
   the improvement wherein said body of magnetostrictive material is latchably switchable between a plurality of levels of strain, thereby producing a fiber grating device latchably switchable between a plurality of wavelengths corresponding to said levels of strain.

2. A tunable grating device according to claim 1 wherein said optical grating is a Bragg grating.

3. A tunable grating device according to claim 1 wherein said grating is strained by transmission of tensile strain.

4. A tunable grating device according to claim 1 wherein said grating is strained by transmission of compressive strain.

5. A tunable grating device according to claim 1 wherein said grating is subjected to two levels of strain to produce a bistable optical response.

6. A tunable grating device according to claim 1 wherein said body of magnetostrictive material is adhered to said optical fiber along the length of said grating.

7. A tunable grating device according to claim 1 further comprising a current source for applying a pulsed current to said electromagnet.

8. A tunable grating device according to claim 1 further comprising a non-magnetic substrate, wherein one end of said grating is secured to said substrate and another end of said grating is secured to said body of magnetostrictive material so that strain from said body is transmitted to said grating.

9. A tunable grating device according to claim 1 further comprising soft magnetic pole pieces disposed at either end of said magnetostrictive body for amplifying the applied magnetic field.

10. A tunable grating device according to claim 1 further comprising a magnetic flux return path extending between opposing ends of the magnetostrictive body for reducing leakage flux.

11. A tunable grating device according to claim 1 wherein said grating and said body of magnetostrictive material have respective lengths, the length of said magnetostrictive body being longer than the length of said grating for amplifying the strain transmitted to said grating.

12. A tunable grating device according to claim 1 wherein said body of magnetostrictive material comprises a stack of a plurality of layers of magnetostrictive material, said layers interconnected by opposite ends for amplifying the strain transmitted to said grating.

13. A tunable grating device according to claim 1 further comprising a plurality of optical fiber gratings secured to said body of magnetostrictive material.

14. In an optical multiplexer/demultiplexer comprising at least one pair of optical circulators and at least one optical fiber grating interconnected between said circulators by optical fiber, the improvement wherein said grating is a tunable optical fiber grating according to claim 1.

15. In an N-channel optical ADD/DROP multiplexer/demultiplexer comprising a plurality of optical circulators and a plurality of optical fiber gratings interconnected by an optical fiber for adding and/or dropping an optical communications channel from said fiber, the improvement wherein at least one optical fiber grating is a tunable optical fiber grating according to claim 1.

16. A wave division multiplexed optical communications system comprising a source of multiple wavelength optical channels transmitted from said source along an optical trunk fiber through a multiplexer/demultiplexer, wherein said multiplexer/demultiplexer comprises a device according to claim 1.

* * * * *